United States Patent
Adams et al.

(10) Patent No.: US 9,191,200 B1
(45) Date of Patent: Nov. 17, 2015

(54) SYSTEM AND METHOD FOR CHANGING THE SECURITY LEVEL OF A COMMUNICATIONS TERMINAL DURING OPERATION

(75) Inventors: Michael D. Adams, Alpine, UT (US); Jared M. Jacobson, North Salt Lake, UT (US)

(73) Assignee: L-3 Communications Corp., New York, NY (US)

(*) Notice: Subject to any disclaimer, the term of this patent is extended or adjusted under 35 U.S.C. 154(b) by 852 days.

(21) Appl. No.: 12/900,349

(22) Filed: Oct. 7, 2010

(51) Int. Cl.
| H04L 9/08 | (2006.01) |
| H04L 29/06 | (2006.01) |
| G06F 21/60 | (2013.01) |
| H04W 12/06 | (2009.01) |
| H04W 12/02 | (2009.01) |

(52) U.S. Cl.
CPC ............ *H04L 9/0822* (2013.01); *G06F 21/602* (2013.01); *H04L 9/088* (2013.01); *H04L 63/0428* (2013.01); *H04L 63/0861* (2013.01); *H04W 12/02* (2013.01); *H04W 12/06* (2013.01); *G06F 2221/2111* (2013.01)

(58) Field of Classification Search
CPC ..... H04L 9/0861; H04L 9/088; H04L 9/0822; H04L 63/0428; G06F 21/602; G06F 2221/2111; H04W 12/02; H04W 12/06
USPC .................. 380/281, 284, 44, 270, 277, 278; 713/155, 189; 726/17
See application file for complete search history.

(56) References Cited

U.S. PATENT DOCUMENTS

| 4,731,840 | A  | * | 3/1988  | Mniszewski et al. ......... 380/284 |
| 6,061,791 | A  |   | 5/2000  | Moreau |
| 6,081,895 | A  | * | 6/2000  | Harrison et al. .............. 713/189 |
| 6,101,255 | A  | * | 8/2000  | Harrison et al. ................ 380/52 |
| 6,185,685 | B1 | * | 2/2001  | Morgan et al. ................ 713/183 |
| 6,307,936 | B1 | * | 10/2001 | Ober et al. ....................... 380/30 |
| 6,374,355 | B1 |   | 4/2002  | Patel |
| 6,662,299 | B1 |   | 12/2003 | Price, III |
| 6,684,330 | B1 | * | 1/2004  | Wack et al. .................... 713/162 |
| 6,754,820 | B1 | * | 6/2004  | Scheidt et al. ................ 713/166 |
| 6,959,086 | B2 | * | 10/2005 | Ober et al. ....................... 380/30 |
| 6,959,394 | B1 |   | 10/2005 | Brickell et al. |
| 7,010,685 | B1 | * | 3/2006  | Candelore ..................... 713/164 |
| 7,089,417 | B2 | * | 8/2006  | Wack et al. .................... 713/162 |
| 7,225,161 | B2 | * | 5/2007  | Lam et al. ........................ 705/51 |
| 7,464,267 | B2 |   | 12/2008 | Zhu et al. |
| 7,590,860 | B2 | * | 9/2009  | Leporini et al. ............... 713/185 |
| 7,596,697 | B2 | * | 9/2009  | Sandhu et al. ................. 713/171 |
| 7,962,702 | B1 | * | 6/2011  | Bean .............................. 711/154 |
| 8,041,947 | B2 | * | 10/2011 | O'Brien et al. ............... 713/166 |
| 8,060,744 | B2 | * | 11/2011 | O'Brien et al. ............... 713/166 |
| 8,127,145 | B2 | * | 2/2012  | O'Brien et al. ............... 713/189 |

(Continued)

OTHER PUBLICATIONS

FIPS Pub 140-2: Security Requirements for Cryptographic Modules. May 25, 2001. p. 1-69.*

(Continued)

*Primary Examiner* — Kari Schmidt
(74) *Attorney, Agent, or Firm* — Kirton | McConkie

(57) ABSTRACT

The security level of a communications terminal can be changed during operation. A key loading device can reconstitute a key encryption key from plural split portions. The split portions can be loaded into the key loading device via various interfaces. The reconstituted key encryption key can be used to unwrap wrapped keys stored in the key loading device.

27 Claims, 4 Drawing Sheets

(56) References Cited

U.S. PATENT DOCUMENTS

| | | | |
|---|---|---|---|
| 8,204,480 B1* | 6/2012 | Lindteigen et al. | 455/411 |
| 8,270,963 B1* | 9/2012 | Hart et al. | 455/418 |
| 2001/0001876 A1* | 5/2001 | Morgan et al. | 713/171 |
| 2001/0050990 A1 | 12/2001 | Sudia | |
| 2002/0080958 A1* | 6/2002 | Ober et al. | 380/44 |
| 2004/0044902 A1* | 3/2004 | Luthi | 713/200 |
| 2004/0101139 A1* | 5/2004 | Wack et al. | 380/277 |
| 2006/0050870 A1* | 3/2006 | Kimmel et al. | 380/30 |
| 2006/0053285 A1* | 3/2006 | Kimmel et al. | 713/166 |
| 2006/0218400 A1* | 9/2006 | Kimmel et al. | 713/168 |
| 2006/0233371 A1* | 10/2006 | Sowa et al. | 380/248 |
| 2006/0242407 A1* | 10/2006 | Kimmel et al. | 713/166 |
| 2007/0172067 A1* | 7/2007 | Otal et al. | 380/277 |
| 2007/0226493 A1* | 9/2007 | O'Brien et al. | 713/166 |
| 2007/0226494 A1* | 9/2007 | O'Brien et al. | 713/166 |
| 2007/0258585 A1* | 11/2007 | Sandhu et al. | 380/44 |
| 2009/0060197 A1* | 3/2009 | Taylor | H04L 9/0618 380/277 |
| 2009/0276629 A1* | 11/2009 | Wu et al. | 713/175 |
| 2009/0323970 A1* | 12/2009 | Cerruti et al. | 380/281 |

OTHER PUBLICATIONS

Ng, Wee Hock Desmond, et al. "Dynamic balanced key tree management for secure multicast communications." Computers, IEEE Transactions on 56.5 (2007): 590-605.*

Huckell, Gary R. "User friendly security solutions for the MUSO common air interface (CAI)." MILCOM 2002. Proceedings. vol. 1. pp. 316-320. IEEE, 2002.*

Barker, et al., A Framework for Designing Cryptographic Key Management Systems:, National Institute of Standards and Technology, Draft Special Publication, Jun. 15, 2010, 88 pages.

Haipe, Wikipedia Definition, http://en.wikipedia.org/wiki/HAIPE, May 20, 2010, 3 pages.

IPsec, Wikipedia Definition, http://en.wikipedia.org/wiki/IPsec, Jun. 30, 2010, 8 pages.

Key distribution, Wikipedia Definition, http://en.wikipedia.org/wiki/Key_distribution, Dec. 17, 2009, 1 page.

Secret sharing, Wikipedia Definition, http://en.wikipedia.org/wiki/Secret_sharing, Jul. 3, 2010, 6 pages.

EKMS, Wikipedia Definition, http://en.wikipedia.org/wiki/EKMS, Jun. 11, 2010, 3 pages.

* cited by examiner

SYSTEM AND METHOD FOR CHANGING THE SECURITY LEVEL OF A COMMUNICATIONS TERMINAL DURING OPERATION

FIELD

The present application relates to wireless communications systems. More particularly, the present application relates to key distribution in a wireless communications system using encryption.

BACKGROUND

Wireless communications is becoming increasingly important, with wireless systems finding their way into ever growing numbers of applications. Wireless systems have become ubiquitous in the military environment.

Many wireless communications system use encryption to protect communicated data from unauthorized interception. In an encryption system, the message to be hidden (sometimes called "plaintext") is modified in a reversible way (by a process sometimes referred to as "encryption") such that the substance of the message is hidden. The resulting encrypted message (sometimes called "ciphertext") can then be transmitted across an unsecured (subject to eavesdropping or interception) channel. Upon reception, the original message is recovered by reversing the modification (by a process sometimes referred to as "decryption"). Of course, to ensure that only the desired recipient can properly decrypt the encrypted message, some aspect of the encryption algorithm is kept secret. Typically, the encryption algorithm operates using a key which is kept secret while the details of the algorithm may be publicly disclosed. Distribution of the key is limited to those authorized to receive the messages that are encrypted with the key.

Distribution of keys in a secure manner is a difficult aspect in encrypted communications. Clearly, distribution of keys through an unsecured channel is undesirable, since an eavesdropper can obtain the key and then decrypt any subsequent encrypted communications using that key. Accordingly, in many communications systems, it is necessary to distribute keys through some other means outside the communication system. Typically, personnel and equipment which handle the keys must also be authorized to receive the messages that are encrypted. For example, for protection of classified information, the keys, materials on which the keys are stored, and systems which have keys loaded within all must be handled as classified items. Accordingly, distribution of keys can be quite tedious. While some schemes, such as public key cryptosystems, attempt to reduce difficulties of key distribution (e.g., using asymmetric encryption and decryption algorithms), such schemes often do not work well in unidirectional and multicast environments. Even when such schemes work for the intended use, distribution of the private keys and certificates can remain difficult.

In an encrypted communications system, it is often desirable to change keys frequently. This can be part of regular security measures which dictate that it is undesirable to transmit too much information using the same key. Changing keys may also be necessary if a node has been compromised in some way that might result in the key being available to an unauthorized eavesdropper. Of course, changing keys complicates the key distribution problem, as new keys must periodically be distributed to users of the system.

The aforementioned challenges in encrypted communications are multiplied when communications nodes are located in remote or unmanned areas. For example, increasing use of unmanned air vehicles (UAVs) and unmanned ground vehicles (UAGs) is being made. Once a UAV or UAG begins an operational mission, access to the UAV or UAG to load in new keys is sometimes not possible.

SUMMARY

In some embodiments of the invention a method of preparing a communications terminal for secure operation is provided. The method can include generating a key encryption key that is at a third security level. The key encryption key can be used to wrap a first key to form a wrapped first key. The first key can be at a second security level, and the wrapped first key can be at a first security level that is lower than the second security level. The second security level can be the same as or different from third security level. The key encryption key can be split into a plurality of portions, such that the key encryption key cannot be reconstituted from less than a predefined number of the plurality of portions. The plurality of split key portions can be at the first security level. At least one portion (less than all of the portions) can be stored in the key loading device. The wrapped key can also be stored within the key loading device. At least one second portion, (less than all of the portions) can be provided to at least one initiation device. At least one third portion (less than all of the portions) can be provided to a communications facility capable of communicating over a communications link with the communications terminal. The key encryption key and all but the first portions of the split key portions can be erased from the key loading device so that the key loading device is at the first security level.

In some embodiments of the invention, a method of changing the security level of a communications terminal during operation is provided. The method can include providing a key loading device to the communications terminal. The key loading device can include a secure memory. At least a first split portion of a key encryption key and a wrapped first key can be stored in the key loading device. The first portion and the wrapped first key can be at a first security level. At least a second split portion of the key encryption key can be loaded into the key loading device via a physical interface. At least a third split portion of the key encryption key can be transferred into the key loading device via a communications link. The method can also include reconstituting a key encryption key from the split portions of the key encryption key, wherein the key encryption key cannot be reconstituted from less than a predefined number of the plurality of portions. The key encryption key can be at a third security level higher than the first security level. Using the key encryption key, the wrapped key can be unwrapped to obtain a first key. The first key can be at a second security level higher than the first security level. The second security level can be the same as or different from the third security level. The first key can be used within the communications terminal to perform cryptographic operations.

In some embodiments of the invention a communications system capable of changing a security level during operation is provided. The communications system can include a communications terminal. An encryption device capable of accepting a traffic encryption key can be disposed within the communications terminal. A secure memory can be coupled to the communications terminal. The secure memory can be capable of storing a wrapped first key and a plurality of portions of a split key encryption key, and a first split portion of a key encryption key can be stored within the secure memory. The system can include a physical interface capable of accepting a second split portion of a key encryption key into the secure memory. The system can also include a communication interface capable of transferring a third split portion of the key encryption key into the secure memory. A key reconstitutor can be coupled to the secure memory and capable of reconstructing the key encryption key from the plurality of portions of the split key encryption key wherein the key encryption key cannot be reconstituted from less than a predefined number of the split portions. A key unwrapper can be coupled to the secure memory and capable of decrypting the first key using the key encryption key. The system can provide a key fill interface between the key unwrapper and the encryption device capable of transferring a traffic encryption key into the encryption device. The traffic encryption key can be any of: the first key, a second key unwrapped using the first key, a second key received over an encrypted communications link protected by the first key, and a third key wrapped using a second key and received over an encrypted communications link protected by the first key.

In some embodiments of the invention, a key loading device capable of changing the security level of a communications terminal is provided. The key loading device can include a secure memory capable of storing a first split portion of a key encryption key and a wrapped first key. A data input port can be coupled to the secure memory and capable of accepting a second split portion of the key encryption key and storing the second split portion into the secure memory. A terminal interface can be capable of interfacing to a communications terminal and accepting a third split portion of the key encryption key and storing the third portion into the secure memory. The key loading device can include a means for combining the split portions of the key encryption key to obtain the key encryption key, wherein the key encryption key cannot be reconstituted from less than a predefined number of the split portions. The split portions can be at a first security level and the key encryption key can be at a third security level. The key loading device can include a means for unwrapping the wrapped first key using the key encryption key to obtain the first key The first key can be at a second security level, which can be the same as or different from the third security level. A key output port can be capable of transferring a traffic key to cryptographic unit of the communications terminal. The traffic key can be any of: the first key, a second key unwrapped using the first key, a second key received over an encrypted communications link protected by the first key, and a third key wrapped using a second key and received over an encrypted communications link protected by the first key.

BRIEF DESCRIPTION OF THE DRAWINGS

Additional features and advantages of the invention will be apparent from the detailed description that follows, taken in conjunction with the accompanying drawings, that together illustrate, by way of example, features of the invention; and, wherein.

DETAILED DESCRIPTION

Figure 1:
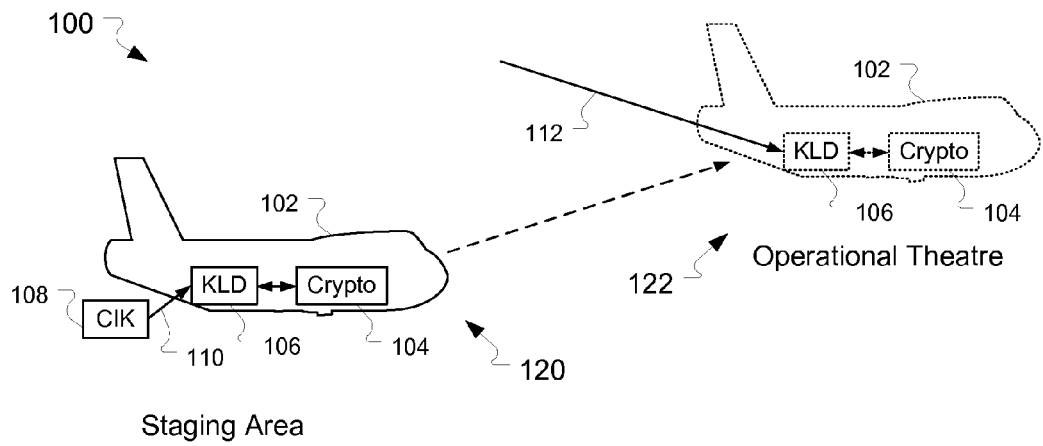
FIG. 1 is a block diagram of a system in accordance with some embodiments of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In describing the present invention, the following terminology will be used:

The singular forms "a," "an," and "the" include plural referents unless the context clearly dictates otherwise. Thus, for example, reference to a terminal includes reference to one or more terminals.

The term "ones" refers to one, two, or more, and generally applies to the selection of some or all of a quantity. The term "plurality" refers to two or more of an item.

As used herein, the term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art.

As used herein, the term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described.

As used herein, a plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items.

As used herein, the term "alternatively" refers to selection of one of two or more alternatives, and is not intended to limit the selection to only those listed alternatives unless the context clearly indicates otherwise.

Turning to FIG. 1, a system 100 which can change security level during operation is illustrated in accordance with some embodiments of the present invention. The system can include a communications terminal 102 which can be capable of communications over various links. In some embodiments, the communications terminal can provide wireless communications links. For example, the communications terminal can include a satellite communications terminal, a tactical communications terminal, a wireless networking terminal, a personal communications terminal, or the like. In some embodiments, the communications terminal can be disposed on a mobile platform, such as an aircraft, a ground vehicle, a waterborne vehicle, which can be manned or unmanned (e.g., an unmanned air vehicle as illustrated here). In some embodiments, the communications terminal can provide wired communications links alternatively to or in addition to wireless links. For example, the communications terminal can include Ethernet links, optical links, dedicated lines, or the like.

The communications terminal can include a cryptographic device 104 to support secured communications. For example, the cryptographic device can be a HAIPE device, an IPsec device, a TRANSEC device, a secure storage device, a National Security Agency (NSA) approved "Type 1" device (i.e., a device authorized for protecting classified information), or the like. Various encryption systems can be used, including NSA Suite A, AES, Twofish, Blowfish, Serpent, RC-4, IDEA, Camellia, CAST-256, RC6, SAFER, Threefish, and the like. Accordingly, keys can be loaded into the cryptographic device. As the communications terminal may be handled by personnel which are not authorized to possess the keys (e.g., uncleared maintenance personnel), the system can use techniques to change the security level of the communications terminal during operation. The communications terminal can therefore include a key loading device 106 (KLD) which facilitates the loading of keys into the cryptographic device. Operational keys can be protected by using wrapping, splitting, or both. The operational keys can be unwrapped, reconstituted, or both, by the key loading device to enable cryptographic operations in the communications terminal as will be explained below.

In some embodiments, operational keys can be split into multiple portions. For example, a key can be split using an algorithm which separates the key into a plurality of portions, wherein the key cannot be reconstituted from less than all of the portions. For example, a key can be split into three portions, and the three portions distributed to three different individuals. In such a scenario, the key cannot be reconstituted by any one of the individuals without the cooperation of the others. To reconstitute the key requires all three persons to cooperate. More generally, a key can be split into N portions, wherein the key cannot be reconstituted from less than M of the portions. In particular, M can be greater or equal to two, and less than or equal to N ($2 \leq M \leq N$). For example, keys can be split using algorithms such as exclusive- or, Kothari's generalized linear threshold scheme, Shamir's LaGrange interpolating polynomial scheme, Blakley's vector secret-sharing scheme, and similar algorithms. For example, a classified key can be split into multiple portions, and an individual portion of the key can then be treated as unclassified provided that at least one portion of the split key remains controlled in some way that assures that the portions are not combined outside of a classified domain.

In some embodiments, operational keys can be wrapped. For example, a key can be wrapped using a key encryption key (KEK). Wrapping can be performed, for example, by encryption. For example, the National Institute of Standards and technology (NIST) has defined a key wrapping algorithm using the Advanced Encryption Standard (AES). As another example, the NSA defines various key wrapping algorithms, including Type 1 algorithms. Wrapped keys are generally at a lower security level than the unwrapped key. For example, a classified (e.g. at third security level) traffic encryption key (TEK) can be wrapped by a classified KEK, to produce a wrapped TEK (wTEK). The wTEK can be unclassified (e.g., at a first security level).

In some embodiments, a KEK can be generated (e.g., with the key loading device 106) and used to wrap one or more keys (e.g., one or more TEKs or additional KEKs). The KEK can then be split to produce multiple split key portions (i.e., s1KEK, s2KEK, . . . ). One or more portions of the split KEK, along with the wrapped keys can be distributed through unsecure channels to the communications terminal. For example, the wrapped keys (e.g., wK1) can be stored within the key loading device 106 along with one or more portions of the split key portions of the KEK (e.g., s1KEK). Other portions of the split key portions of the KEK (e.g., s2KEK, s3KEK) can be distributed outside the key loading device and erased from within the key loading device. Accordingly, the key loading device, when holding the wrapped keys and less than all of the split key portions of the KEK can be at a first (e.g., unclassified) security level. Thus, the communications terminal 102, even with the key loading device installed, can be at the first security level. As will be explained below, when the remaining split key portions of the KEK are loaded back into the key loading device, the security level of the communications terminal can be increased to the second or third security level.

A second portion of the split key encryption key (e.g., s2KEK) can be loaded into a crypto ignition key (CIK) 108. The CIK can also be at the first security level. The CIK can be interfaced to the key loading device 106 via a physical interface 110. For example, during an initialization sequence (e.g., in a secure facility), the CIK can be temporarily interfaced to the key loading device to transfer the second portion of the split key encryption key from the key loading device into the CIK. Later, when preparing the communications terminal 102 for deployment (e.g., in a staging area), the CIK can be temporarily interfaced to the key loading device to load the second portion of the split key encryption key into the key loading device. The CIK can be physically small, and thus can be easy controlled. For example, the CIK may be handled as a cryptographically controlled device or a high-value item. Because the CIK contains at least one of the split portions of the KEK, without the CIK, it is not possible to reconstitute the keys in the key loading device. Accordingly, the communications terminal without the key loading device installed may be handled by uncleared personnel, while only the CIK needs to be kept under control by a cleared person. This can facilitate the preparation and maintenance of the communications terminal by uncleared personnel. Moreover, even after the second split portion of the split key encryption key has been loaded, the communications terminal can remain in a lower security level until the third portion of the split key encryption key is loaded.

The third portion of the split encryption key (e.g., s3KEK) can be loaded into communications terminal 102 via a communications link. For example, the third portion can be loaded via a secure out-of-band communications link between the communications terminal and a key management facility (e.g., via a secure Internet connection, a telephone line, a dedicated line, a cell phone, a wireless link, etc.). As another example, the third portion can be loaded via an in-band communication link between the communications terminal and a key management facility (e.g., via a dedicated line, an Ethernet interface, an optical interface, etc.). If desired, the loading of the third portion can occur after the communications terminal has been deployed from the staging area (position 120) into an operational theatre (position 122). For example, the third portion can be transferred via a wireless communications link 112 provided by the communications terminal. If the third one of the split portions of the KEK is not loaded into the communications terminal until after it has left the staging area, the communications terminal can remain at a low security level while in the staging area, and be bootstrapped into the higher security level after leaving the staging area.

After the key loading device 106 has all three portions (e.g., s1KEK, s2KEK, and s3KEK) of the split key encryption key, the key encryption key (KEK) can be reconstituted. The KEK can be at the third security level (e.g., classified), and thus at a higher security level than the first security level. After reconstituting the KEK, the KEK can be used to unwrap the wrapped keys (e.g., wK1) to obtain the keys (e.g., K1). The unwrapped keys can be at the third security level. As another example, the keys can be at a second security level which is higher than the first security level but lower than the third security level. For example, KEKs can be at a higher security level (e.g. the third security level) than the keys that they wrap (e.g., keys at the second security level). The unwrapped keys can then be used to perform cryptographic operations, for example, as illustrated below.

Various different types of keys can be wrapped and stored in the key loading device 106. Accordingly, a number of different operational scenarios can be supported.

As a first example, the wrapped keys can include one or more TEKs used to communicate encrypted data over the communications link (e.g., K1=TEK1). After the TEK(s) are unwrapped, they can be loaded into the cryptographic device 104 to enable communicating encrypted data over the communications link. For example, plaintext can be encrypted using the TEK(s) to obtain ciphertext, which is transmitted over the communications link. Ciphertext received over the communications link can be decrypted using the TEK(s) to obtain plaintext. If desired, over the air rekey can be performed by transferring additional TEK(s) over the communications link.

As a second example, the wrapped keys can include one or more additional KEKs which are used to unwrap wrapped one or more TEK(s) received over communications links (e.g., K1=KEK2). For example, the additional TEK(s) can be received via an in-band or out-of-band communications link. The TEK(s) received over the communications link can be unwrapped using the KEK(s) (e.g., KEK2), and the unwrapped TEK(s) loaded into the cryptographic device to enable communicating encrypted data over the communications link. If desired, over the air rekey can be performed by transferring additional TEK(s) over the communications link. If desired, the TEK(s) can be received over a first communications link and the TEK(s) can be used to protect a second communications link.

As a third example, the wrapped keys can include a second KEK (KEK2) and a first TEK (TEK1). After the KEK2 and TEK1 are unwrapped using KEK, the TEK1 can be loaded into the cryptographic device 104 to enable communicating encrypted data over the communications link using TEK1. A second TEK (TEK2) can be received over the encrypted link (and thus decrypted using TEK1). The TEK2 can also be wrapped using KEK2, and thus the received TEK2 can be unwrapped using KEK2. The TEK2 can then be loaded into the cryptographic device to enable communicating encrypted data over the communications link using TEK2. Additional keys can be received in a similar manner.

The foregoing examples are not exhaustive, and other combinations and variations of the above can be used as well.

The key loading device 106 can provide for secure storage of the keys. For example, the key loading device can include a secure memory. A secure memory can be a tamper resistant memory. For example, the secure memory can be interlocked to a package in which the secure memory is installed in such a way that physical access attempts to the memory can be detected, and the memory contents erased.

Figure 2:
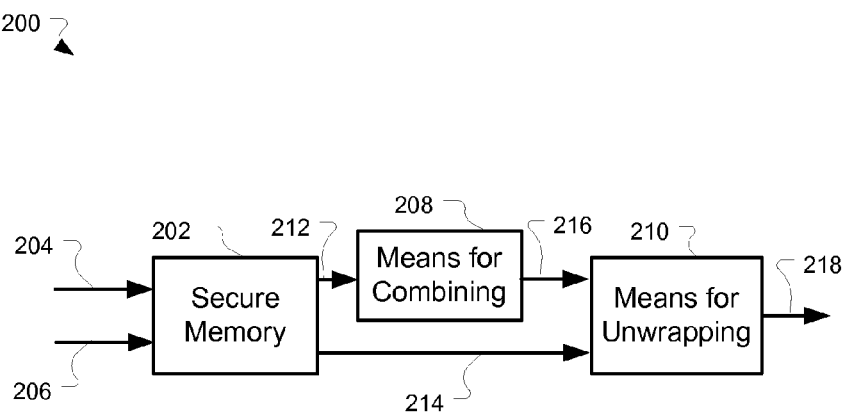
FIG. 2 is a block diagram of a key loading device which can be used in the system of FIG. 1 in accordance with some embodiments of the present invention.

FIG. 2 illustrates a block diagram of one example of a key loading device 200 which can be used as the key loading device 106 in the system 100 of FIG. 1. The key loading device can include a secure memory 202. The secure memory can provide storage for one or more keys and one or more split portions of a key. For example, the secure memory can provide storage for a first split key portion of a key encryption key (e.g., s1KEK) and a wrapped first key (e.g., wK1). A data input port 204 can be capable of accepting a second split key portion (e.g., s2KEK) and storing the second split key portion into the secure memory. For example, the data input port can be a serial interface, a parallel interface, a DS-101 interface, a DS-102 interface, or the like. The data input port can also provide for data output (e.g., via a bidirectional interface), for example, the allow output of a second split key portion.

A terminal interface 206 can be capable of interfacing to the communications terminal and accepting a third split key portion (e.g., s3KEK) and storing the third split key portion into the secure memory. For example, the terminal interface can be a serial interface, a parallel interface, an Ethernet interface, or the like. The terminal interface can be unidirectional or bidirectional.

The key loading device 200 can include a means 208 for combining a plurality of split key portions to obtain a reconstituted key. For example, the means for combining can be coupled to the secure memory 202 via a memory interface 212, and the means for combining can be capable of combining the s1KEK, s2KEK, and s3KEK to obtain the KEK. As mentioned above, the reconstituted key can be at a higher security level than the split key portions. Various ways of implementing the means for combining can be used. For example, in some embodiments, the means for combining can be implemented using digital hardware, including for example, discrete logic devices, field programmable gate arrays (FPGAs), and application specific integration circuits (ASICs). The digital hardware can be arranged to reverse the key splitting algorithm that was used to split the key. As another example, in some embodiments, the means for combining can be implemented using software executing on a general purpose or specialized processor. Software can include executable code modules or blocks which can reverse the key splitting algorithm that was used to split the key. Examples of processing subsystems which can be used are described further below.

The key loading device 200 can also include a means 210 for unwrapping the wrapped first key using the reconstituted key. For example, the means for unwrapping can be coupled to the secure memory 202 and capable of unwrapping the wK1 using the KEK to obtain the K1. The means for unwrapping can receive the reconstituted key directly from the means 208 for combining, for example via interface 216. Alternatively, the means for combining can store the reconstituted key in the secure memory, and the means for unwrapping can retrieve the reconstituted key from the secure memory via memory interface 214. The unwrapped key (e.g., K1) can be transferred to the cryptographic unit 106 (FIG. 1) via a key output port 218. For example, the key output port can be compatible with a DS-101 or DS-102 key fill interface. In some embodiments, the means for unwrapping can be implemented using digital hardware or software in a similar manner as described above. For example, digital hardware can be used to implement a decrypter for decrypting the wrapped key. As another example, software executing on a general purpose or specialized processor can decrypt the wrapped key.

In some embodiments, the key loading device 200 can include a means for unwrapping one or more additional keys that are stored in the secure memory 202 to obtain one or more additional unwrapped key(s). The unwrapped key(s) can be output to the key output port 218. For example, in some embodiments, the means for unwrapping 210 can provide for unwrapping of one or more wrapped keys stored in the secure memory. In some embodiments, multiple means for unwrapping 210 can be included to provide for unwrapping multiple keys using separate input and output paths to each of the means for unwrapping.

In some embodiments, the key loading device 200 can include a means for unwrapping one or more additional keys that are received from the terminal interface 206. For example, in some embodiments, the means for unwrapping 210 can provide for unwrapping of one or more wrapped keys stored in the secure memory by the terminal interface 206. As another example, in some embodiments, an additional data interface (not shown) can be provided to the means for unwrapping which can be used for providing wrapped keys to the means for unwrapping.

Figure 3:
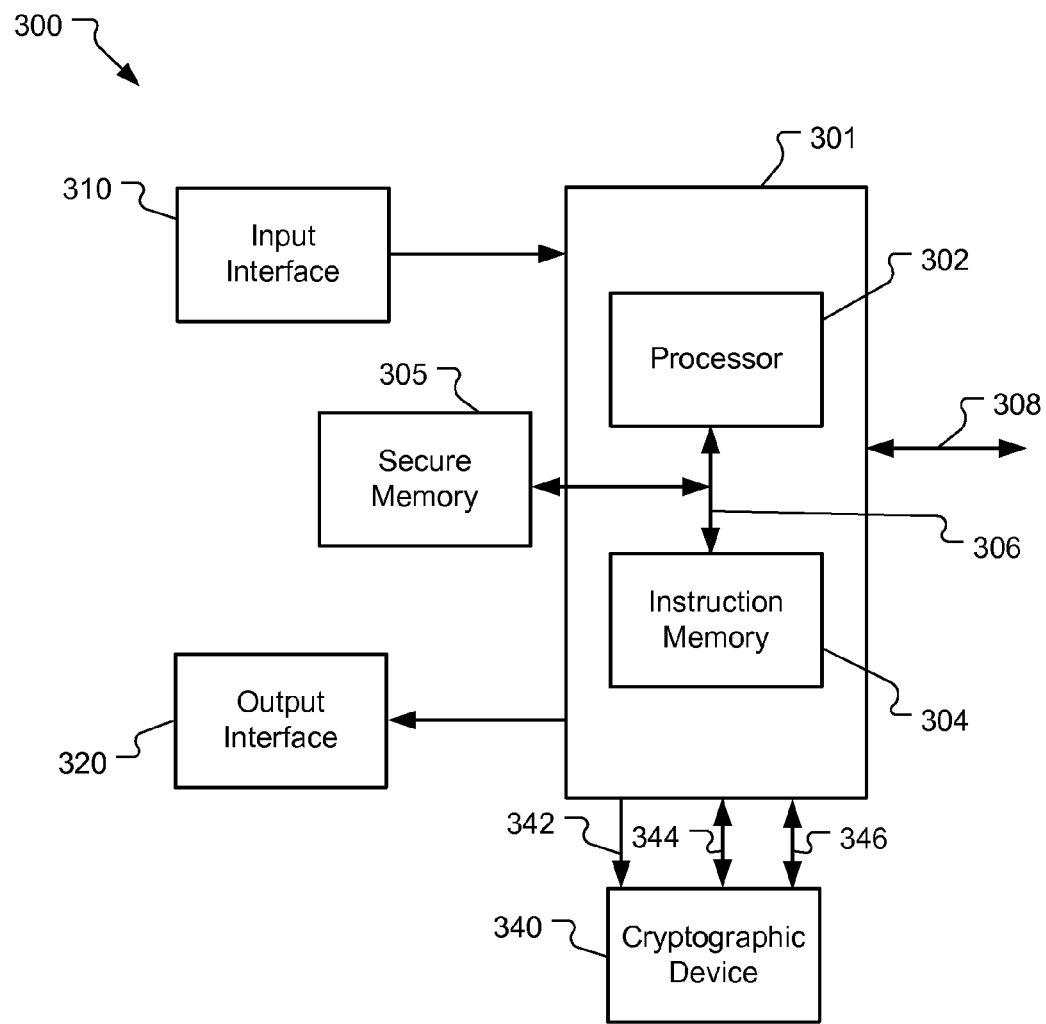
FIG. 3 is a block diagram of another key loading device which can be used in the system of FIG. 1 in accordance with some embodiments of the present invention.

FIG. 3 illustrates another embodiment of a key loading device 300 which can be used as key loading device 106 in the system 100 of FIG. 1. The key loading device can include a general-purpose or special-purpose processing subsystem 301. For example, the processing subsystem can be a personal computer, a notebook computer, a personal digital assistant (PDA) or other hand-held device (e.g., a cellular telephone), a workstation, a minicomputer, a mainframe, a supercomputer, a multi-processor system, a network computer, a processor-based electronic device, or the like. The processing subsystem can include a processor 302 and an instruction memory 304. The processor can be capable of executing computer-executable instructions received from the instruction memory via a bus 306 or similar interface. The processor can be a single processor or multiple processors (e.g., a central processor and one or more other processors designed to perform a particular function or task). The instruction memory can be integrated into the same semiconductor device or package as the processor. The bus can be configured to connect various components of the computer system, and can include any of a variety of bus structures including a memory bus or memory controller, a peripheral bus, or a local bus that uses any of a variety of bus architectures. The bus can be used to interconnect the processor, instruction memory, and other components, such as mass storage devices, input/output interfaces, network interfaces, and the like.

The key loading device can include a secure memory 305, which can interface to the processing subsystem via the bus 306 or other interface. The secure memory can, for example, be like secure memory 202 described above. The secure memory and the instruction memory 304 can be provided by the same memory device or by different memory devices.

As described further below, computer-executable instructions can cause the processor 302 to execute functions. The computer-executable instructions can be permanently stored in the instruction memory 304 or temporarily stored in the instruction memory and loaded into the instruction memory from a computer-readable medium, for example, via an interface 308. The computer-executable instructions can include any of: data structures, objects, programs, routines, and program modules that can be accessed by the processor. For example, computer-executable instructions can include operating system instructions used to establish communication or enable loading of programs, such as during start-up of the computer system. In general, computer-executable instructions cause the processor to perform a particular function or group of functions and are examples of program code means for implementing methods disclosed herein. Furthermore, a particular sequence of the executable instructions provides an example of corresponding acts that can be used to implement the operations of such methods.

Examples of computer-readable media include random-access memory (RAM), read-only memory (ROM), programmable read-only memory (PROM), erasable programmable read-only memory (EPROM), electrically-erasable programmable read-only memory (EEPROM), compact disk read-only memory (CD-ROM), digital video disk (DVD), magnetic medium, or any other device or component that is capable of providing data or executable instructions that can be accessed by a processor. Computer-readable media can be a non-transitory media (e.g., a physical device as described above) which allows for permanent, semi-permanent, or temporary storage of executable instructions.

The key loading device 300 can include various input/output interfaces, including for example an input interface 310. The input interface can be used to accept split key input data (e.g., from a crypto ignition key), communications data from a communications link (e.g., from the communications terminal), and the like. The input interface can use, for example, a serial interface (e.g. RS-232, RS-422 etc.), a parallel interface, a universal serial bus (USB) interface, a firewire interface (IEEE 1394), SD, SDIO, eSATA, and the like. The computer system can also include an output interface 320. The output interface can be used to provide key fill to a cryptographic device (e.g., a cryptographic device within the communications terminal, or a cryptographic device within the key loading device). The output interface can be the same or different than the input interface.

Accordingly, the processing subsystem 301 can be used to implement portions of the key loading device 300 in distinct software modules. The software modules can include instructions to cause the processor 302 to implement the modules. For example, the instructions can cause the processor to reverse a key splitting algorithm to provide a means for combining a plurality of split key portions to obtain a key. As another example, the instructions can cause the processor to unwrap a wrapped key to provide a means for unwrapping a wrapped key to obtain the key.

Alternatively, if desired, a cryptographic device 340 can be included in the key loading device 300. The cryptographic device can be used for wrapping and unwrapping keys. Accordingly, the KEK can be provided to the cryptographic device by the processor via a key fill interface 342 of the cryptographic device, and then keys to be wrapped provided via a plaintext interface 344 of the cryptographic device. The wrapped keys can be returned via a ciphertext interface 346 of the cryptographic device. Keys can be unwrapped by providing the wrapped key via the ciphertext interface and retrieving the unwrapped key from the plaintext interface. Thus, the processor can unwrap one or more keys by providing the key(s) via the plaintext interface and retrieving the wrapped key(s) from the ciphertext interface. Any or all of the key fill interface, plaintext interface, and ciphertext interface can be connected to the processor (as shown), or alternatively, can connect directly to the secure memory.

Similarly, the processor 302 can unwrap one or more keys by providing the wrapped key(s) to the ciphertext interface 344 and retrieving the unwrapped key(s) from the plaintext interface 346. The cryptographic unit can be, for example, a cryptographic device as described above, or a cryptographic system implemented using discrete hardware or software components. If desired, additional cryptographic units (not shown) can be included, for example, when using more than one KEK or more than one TEK to perform cryptographic operations. For example, when the communications terminal provides multiple communications links, a different cryptographic unit can be used for each of the communications links.

If desired, a cryptographic unit can be used in a similar manner for the splitting and unsplitting of keys. For example, a second cryptographic unit (not shown) can be interfaced to the processing subsystem. Splitting and reconstituting keys can proceed in a similar manner as described for encryption/decryption. For example, keys and reconstituted keys can be provided to/from a plaintext interface and split portions of keys can be provided to/from a ciphertext interface.

If desired, when the cryptographic unit 340 is used for unwrapping wrapped keys, a connection (not shown) can be provided from the cryptographic unit to the output interface 320 to allow output of unwrapped keys directly from cryptographic unit for output to the communications terminal. Similarly, a connection (not shown) can be provided from the input interface 310 to allow input of keys directly from the input interface to the cryptographic unit.

If desired, multiple cryptographic units can be used to assist in red/black separation within the key loading device. For example, a first cryptographic unit can be used for reconstituting a key encryption key and can then provide the key encryption key directly to a second cryptographic unit. As another example, different cryptographic units can operate at different security levels.

Figure 4:
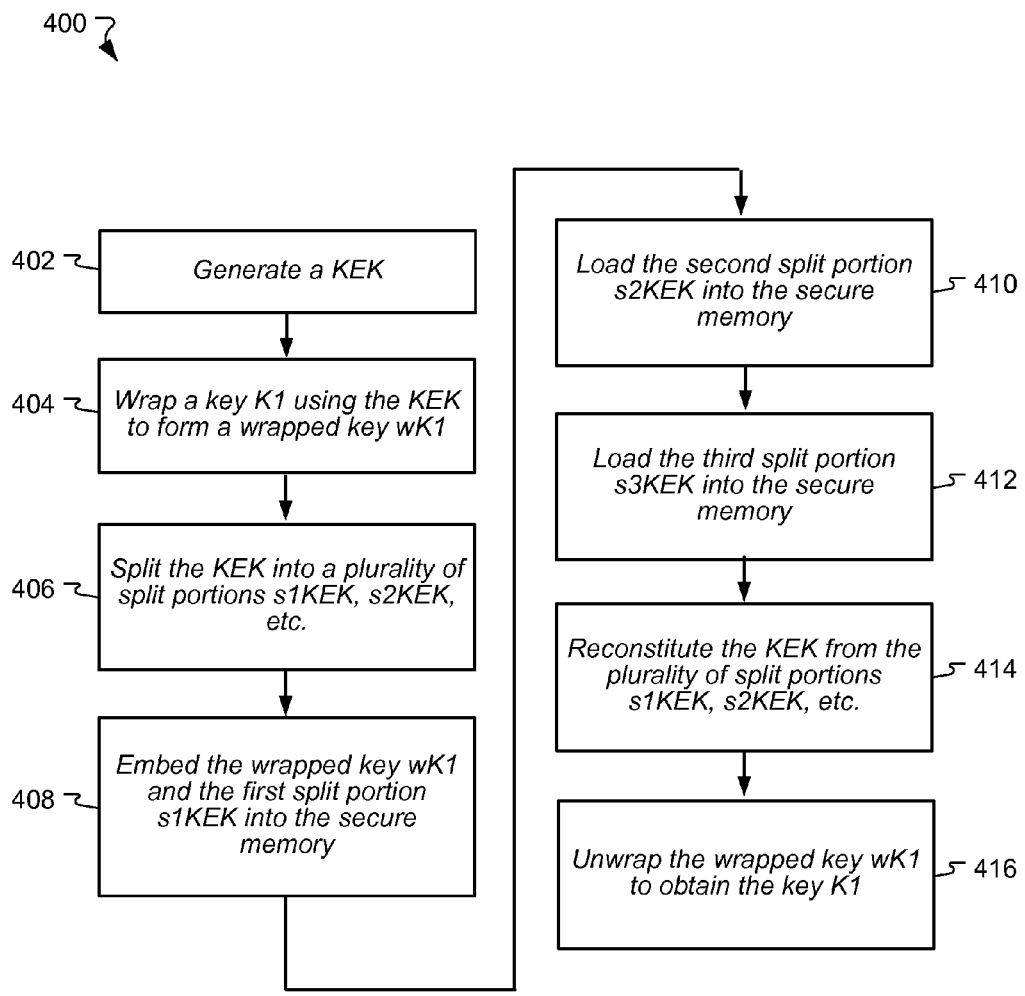
FIG. 4 is a flow chart of a method of operating a key loading device in accordance with some embodiments of the present invention.

FIG. 4 provides a flow chart of a method 400 of operating a key loading device which can be used to prepare a communications terminal for operation. For example, the method 400 can be implemented in whole or in part in a key loading device, for example, the key loading device 300 of FIG. 3. It will be appreciated, however, that the method can be implemented by other systems and devices, and conversely, the key loading device can implement other methods instead of or in addition to that illustrated in FIG. 4.

A first portion of the method 400, comprising blocks 402, 404, 406 and 408, can be an example of a method for preparing a communications terminal for secure operation. For example blocks 402, 404, 406 and 408 can be an initialization sequence performed in a secure facility. The initialization sequence can include generating a KEK in block 402. For example, the KEK can be generated using a random number generator algorithm. In block 404, one or more keys (e.g., K1) can be wrapped using the KEK to provide wrapped keys (e.g., wK1). For example, the processor 302 can execute a key wrapping algorithm as described above. As another example, the processor can use a cryptographic device as described above. As another example, the one or more keys can be provided to the key loading device, for example, from a key distribution center (e.g., loaded into the key loading device via the input interface 310). As another example, the keys can be generated using a random number generator algorithm. The keys can include TEKs and/or KEKs.

After the keys have been wrapped using the KEK, the KEK can be split in block 406. The KEK can be split into a plurality of split key portions (e.g., s1KEK, s2KEK, . . . ), wherein the KEK cannot be reconstituted from less than a predefined number of the plurality of portions. For example, the predefined number can be between 2 and the total number of portions the key has been split into. For example, the KEK can be split into three portions, wherein the KEK cannot be reconstituted from less than all three of the split portions. As another example, the KEK can be split into six portions, wherein the KEK cannot be reconstituted from less than four of the six portions. The processor can execute a key splitting algorithm, for example, as described above. As another example, the processor can pass keys through an external cryptographic device to perform the key splitting as described above. In block 408, a first one of the split portions (e.g., s1KEK) can be stored in the secure memory 305 along with the wrapped key(s) (e.g., wK1). The remaining split portions of the KEK can be output from the key loading device, for example, via the output interface 320 to be provided to other system components, after which they can be erased from the secure memory. For example, some (e.g., a second one) of the split portions (e.g., s2KEK) can be provided to one or more initiation devices (e.g., a crypto ignition key). As another example, some (e.g., a third one) of the split portions (e.g. s3KEK) can be provided to a key management facility capable of communicating with the communications terminal. The initialization operations can be performed within a secure facility. Following the initialization operations, the remaining split portions of the keys (e.g., s2KEK, s3KEK) and KEK can be erased from the key loading device to lower the security level of the key loading device. The key loading device can be removed from the secure facility once the security level has been lowered.

A second portion of the method, comprising blocks 410, 412, 414, and 416 can be an example of a method for changing the security level of a communications terminal during operation. In block 410, a second one of the split portions (e.g., s2KEK) can be loaded back into the secure memory via the input interface 310. For example, the initiation device (or multiple initiation devices, if used) can be temporarily interfaced to the key loading device 300. In block 412, the third one of the split portions (e.g., s3KEK) can be transferred into the secure memory 305 via the input interface. For example, the third one of the split portions can be received via a communications link to the input interface. If desired, multiple ones of the split portions may be communicated via one or more communications links. The KEK can then be reconstituted from the first, second, and third split portions in block 414. For example, the processor 302 can reverse the key splitting algorithm that was used in block 406 (and thereby return the device to the second or third security level). As another example, the processor can use an external cryptographic device to reverse the key splitting as described above. In block 416, the KEK can be used to unwrap the wrapped keys (e.g. wK1) to obtain the keys (e.g., K1). For example, the processor can reverse the wrapping algorithm that was used in block 404. As another example, the processor can use an external cryptographic device to unwrap the keys as described above. The keys can be used for further cryptographic operations (e.g., to unwrap other keys) or loaded into the communications terminal via the output interface 320. The reconstituted and unwrapped keys can be at a higher security level than the wrapped keys, hence the communications terminal security level can be raised after executing blocks 410, 412, 414 and 416.

If desired, block 410 can be performed in a staging area (which is not a secure area), and block 412 can be performed after moving the communications terminal from the staging area into an operational theatre. If desired, the KEK and unwrapped keys (e.g., K1) can be erased from the key loading device to return the communications terminal to a lower security level. For example, the KEK and unwrapped keys (e.g., K1) can be erased before relocating the communications terminal from the operational theatre back to the staging area.

Figure 5:
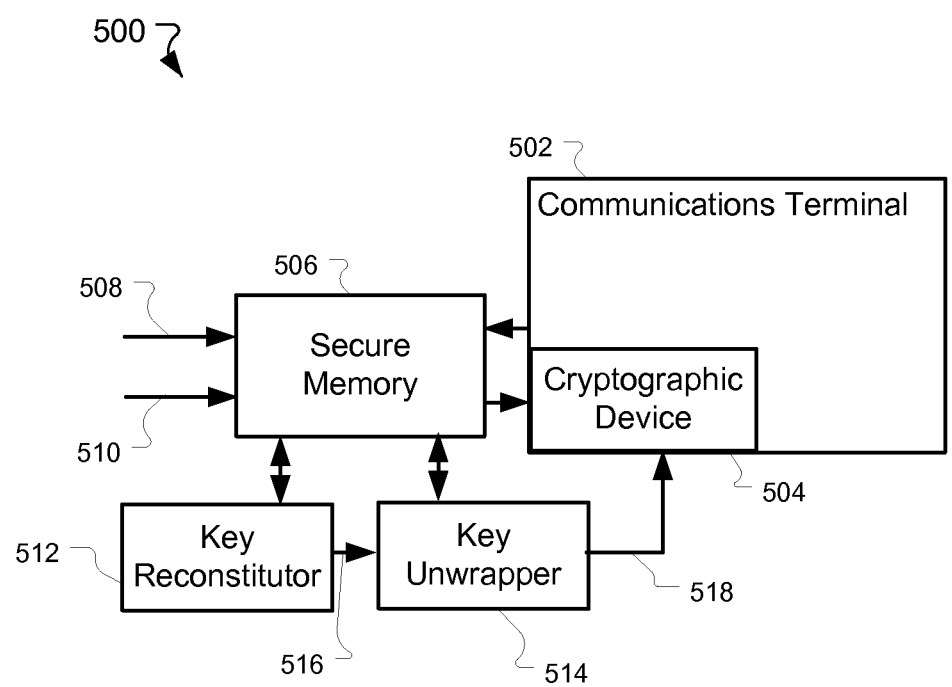
FIG. 5 is a block diagram of a communications system in accordance with some embodiments of the present invention.

FIG. 5 illustrates an example of a communications system in accordance with some embodiments of the present invention. The communications system 500 can include a communications terminal 502 capable of communications. For example, the communications terminal can provide various types of communications links as described above. The communications terminal can include a cryptographic device 504 capable of accepting a traffic encryption key. The cryptographic device can be installed in or coupled to the communications terminal. For example, various types of cryptographic devices can be used as described above. A secure memory 506 can be coupled to the communications terminal. The secure memory can be capable of storing a wrapped first key and a plurality of portions of a split key encryption key, for example as described above. The secure memory can have a first split portion of a key encryption key and the wrapped first key stored therein. The split portions of the key can be, for example, as described above.

The secure memory 506 can provide a physical interface 508 which is capable of accepting a second split portion of the key encryption key. For example, the physical interface can be used to interface to a CIK, as described above. The secure memory can also provide a communications interface 510 capable of transferring a third split portion of the key encryption key into the secure memory. For example, the communications interface can accept data transmitted over a communications link by the communications terminal as described above.

A key reconstitutor 512 can be coupled to the secure memory and capable of reconstructing the key encryption key from the plurality of portions of the split key encryption key. For example, the key reconstitutor can be digital hardware which reverses any one or more of a number of key splitting algorithms as described above. As another example, the key reconstitutor can be a computer system having software to reverse any one or more of the key splitting algorithms as described above. As another example, the key reconstitutor can be a cryptographic device as described above.

A key unwrapper 514 can be coupled to the secure memory and capable of unwrapping a wrapped key using the key encryption key 516. For example, the key unwrapper can be digital hardware which reverses any one or more of a number of key wrapping algorithms as described above. As another example, the key unwrapper can be a computer system having software to reverse any one or more of the key splitting algorithms as described above. As another example, the key unwrapper can be a cryptographic device as described above.

The unwrapped key can be loaded into the cryptographic device 504 via a key fill interface 518. For example, the unwrapped key can be a traffic encryption key. As another example, the unwrapped key can be saved in the secure memory 506, and used to unwrap additional keys (e.g., additional keys stored within the secure memory 506 or additional keys received from the communications interface 510 or communications terminals 502).

Various alternative implementations of the communications system 500 can be used in some embodiments of the invention. For example, rather than providing the key encryption key 516 directly from the key reconstitutor 512 to the key unwrapper 516, the key encryption key can be provided back to the secure memory 506. The key unwrapper can thus retrieve the wrapped keys and key encryption key from the secure memory. As another alternative embodiment, the key unwrapper can provide the unwrapped key back to the secure memory, and the key fill interface can be from the secure memory to the cryptographic device 504.

In some embodiments, the unwrapped key can be a second key encryption key used to unwrap additional keys, for example as described above. In some embodiments, the unwrapped key can comprise a second key encryption key and a traffic encryption key, which can be used to communicate and unwrap additional keys, for example as described above.

The techniques described herein can provide a number of benefits in some embodiments. For example, the addition of a key loading device as in various examples above can allow an over the air re-key (OTAR) function to be provided to existing communications terminals which do not currently have an OTAR capability. For example, KEKs stored within the key loading device (e.g. in a wrapped or split form) can be used to unwrap TEKs which have been wrapped and sent to the communications terminal over the wireless communications link. Because the TEKs are wrapped with a KEK which is never transmitted over the air, secure OTAR is provided.

As another example, in some embodiments, a communications terminal can raise its security level during operation. This can occur by providing low security level split portions of a KEK to the communications terminal via separate distribution channels. For example, split portions of the KEK can be pre-stored in a key loading device, can be distributed via physical hardware assets (e.g., a CIK), and can be distributed via communications links. After multiple split portions of a KEK are provided to the communications terminal, the KEK can be reconstituted, which raises the security level of the communications terminal. Thus, the communications terminal and individual portions of the split KEK can be handled by uncleared or lower security level personnel under some conditions as explained above.

Because split portions of the KEK are handled by separate distribution channels, the risk of compromise of key information is greatly reduced. Moreover, the need for homogenous keying throughout a network can be reduced, since individual, different initialization keys (e.g., KEK and K1) can be used by each communications asset, and these initialization keys can be used only for over-the-air distribution of time-duration limited TEKs. Hence, compromise of an individual asset need not comprise the entire network, as new keys can be loaded to uncompromised assets using their associated initialization keys.

While several illustrative applications have been described, many other applications of the presently disclosed techniques may prove useful. Accordingly, the above-referenced arrangements are illustrative of some applications for the principles of the present invention. It will be apparent to those of ordinary skill in the art that numerous modifications can be made without departing from the principles and concepts of the invention as set forth in the claims.

The invention claimed is:

1. A method of changing the security level of a communications terminal during operation, the method comprising:
providing a key loading device to the communications terminal, wherein the key loading device comprises a secure memory, and stored within the secure memory are: a wrapped first key (wK1) wrapped utilizing a single key encryption key (KEK) and a first split partial portion (s1KEK) of the single KEK but not a second split partial portion (s2KEK) of the single KEK or a third split partial portion (s3KEK) of the single KEK, wherein the single KEK cannot be reconstituted from less than all of the s1KEK, the s2KEK, and the s3KEK, wherein the s1KEK and the wK1 are at a first security level;

loading the s2KEK into the secure memory of the key loading device via a physical interface to the key loading device;

transferring the s3KEK into the secure memory of the key loading device via a communications link, wherein the communications link is different than the physical interface; and reconstituting the single KEK from the s1KEK, the s2KEK and the s3KEK, wherein the reconstituted single KEK is at a third security level higher than the first security level;

unwrapping the wK1 using the reconstituted, single KEK to obtain a first key (K1), wherein the K1 is at a second security level higher than the first security level; and using the K1 within the communications terminal to perform cryptographic operations.

2. The method of claim 1, wherein the communications link is a wireless link provided by the communications terminal.

3. The method of claim 1, wherein the K1 is a key encryption key, the communications link is a first communications link, and further comprising:

receiving a wrapped traffic encryption key (wTEK) over the first communications link;

unwrapping the wTEK using K1 to obtain a traffic encryption key (TEK); and communicating information encrypted using the TEK over a second communications link provided by the communications terminal.

4. The method of claim 3, further comprising:

receiving a second wrapped traffic encryption key (wTEK2) over the second communications link;

unwrapping the wTEK2 using the K1 to obtain a second traffic encryption key (TEK2); and communicating information encrypted using the TEK2 over the second communications link.

5. The method of claim 1, wherein the K1 is a traffic encryption key, and further comprising:

communicating information encrypted using the K1 over the communications link.

6. The method of claim 5, further comprising:

receiving a second traffic encryption key (TEK2) over the communications link; and communicating information encrypted using TEK2 over the communications link.

7. The method of claim 1, wherein the K1 is a key encryption key and further comprising:

unwrapping a second wrapped key (wK2) stored within the key loading device to obtain a second key (K2), wherein the second key is a traffic encryption key;

receiving a wrapped traffic encryption key (wTEK) over the communications link, wherein the communications link is encrypted using K2;

decrypting communications received on the communications link using K2;

unwrapping the wTEK using the K1 to obtain a traffic encryption key (TEK); and communicating information encrypted using the TEK over the communications link using the communications terminal.

8. The method of claim 7, further comprising:

receiving a wrapped second traffic encryption key (wTEK2) over the communications link, wherein the communications link is encrypted using the K2;

unwrapping the wTEK2 using the K1 to obtain a second traffic encryption key (TEK2); and communicating information encrypted using the TEK2 over the communications link.

9. The method of claim 1, further comprising:

generating the single KEK;

using the single KEK to wrap the K1;

after using the single KEK to wrap the K1, splitting the single KEK into the s1KEK, s2KEK and s3KEK within the key loading device;

storing the s1KEK in the key loading device;

distributing the s2KEK and the s3KEK outside the key loading device; and erasing the single KEK, the s2KEK and the s3KEK but not the s1KEK from the key loading device, so that the key loading device is at the first security level.

10. The method of claim 1 further comprising receiving the s2KEK from a first source external to the communications terminal and the key loading device prior to the loading step, and wherein the transferring step comprises receiving via the communications link the s3KEK from a second source different than the first source and external to the communications terminal and the key loading device.

11. The method of claim 1 further comprising, after the step of reconstituting the single KEK:

receiving a second key (K2);

wrapping the K2 using the single reconstituted KEK to form a wrapped second key (wK2); and storing the wK2 in the secure memory.

12. The method of claim 1, wherein:

during the loading, the physical interface is physically connected directly to the key loading device, and the transferring comprises transferring the s3KEK into the secure memory of the key loading device from a remotely located storage device via the communications link.

13. A method of preparing a communications terminal for secure operation when the communications terminal security level can be changed during operation, the method comprising:

generating a single key encryption key (KEK) to produce a single generated KEK, wherein the single generated KEK is at a third security level;

wrapping a first key (K1) using the single generated KEK within the secure facility to form a wrapped first key (wK1), wherein the K1 is at a second security level and the wK1 is at the first security level and the first security level is lower than the second security level;

after the wrapping, splitting the single generated KEK into a plurality of at least three split partial portions of the single generated KEK each of which is a split of the single generated KEK within a key loading device, wherein the single generated KEK cannot be reconstituted from less than a predefined number of the plurality of split partial portions of the single generated KEK, wherein the plurality of split partial portions is at the first security level and the first security level is lower than the third security level;

storing the wK1 and at least a first one (s1KEK) of the plurality of split partial portions of the single generated KEK in a secure memory within the key loading device;

providing at least a second one (s2KEK) of the plurality of split partial portions of the single generated KEK to at least one initiation device;

providing at least a third one (s3KEK) of the plurality of split partial portions of the single generated KEK to a communications facility configured to communicate over a communications link with the communications terminal; and erasing the single generated KEK and all but the at least first one (s1KEK) of the plurality of split partial portions of the single generated KEK from the secure memory, so that the key loading device is at the first security level, wherein after the erasing step, the at least first one (s1KEK) is stored in the secure memory but the at least second one (s2KEK) and the at least third one (s3KEK) are not stored in the secure memory.

14. The method of claim 13, further comprising:

interfacing the initiation device to a physical interface of the key loading device temporarily while at a staging area to allow loading the second split partial portion of the single KEK into the key loading device;

transferring the third split partial portion of the single generated KEK into the key loading device via the communications link;

reconstituting the single generated KEK to form a single reconstituted KEK from the s1KEK, s2KEK, and s3KEK within the key loading device so that the key loading device is at the third security level;

unwrapping the wK1 using the single reconstituted KEK to obtain a first key K1; and using the first key K1 to perform a cryptographic operation within the communications terminal.

15. The method of claim 14, further comprising:

relocating the communications terminal with the installed key loading device from the staging facility to an operational theatre before transferring the s3KEK into the key loading device; and erasing the single generated KEK and the communications key before relocating the communications terminal from the operational theatre back to the staging area so that the key loading device is at the first security level.

16. The method of claim 14, wherein the communications link is a wireless link provided by the communications terminal.

17. The method of claim 13, wherein:

the at least one initiation device is a portable crypto ignition key memory, and the step of providing the s2KEK comprises:

temporarily interfacing the crypto ignition key memory to the secure memory, writing the s2KEK from the secure memory to the crypto ignition key memory, and removing the crypto ignition key memory from the secure memory;

the communications facility is external to the secure memory, the key loading device, and the communications terminal, and the step of providing the s3KEK comprises transmitting the s3KEK from the secure memory over the communications link to the communications facility.

18. A communications system for changing a security level during operation, the system comprising:

a communications terminal;

an encryption device disposed within the communications terminal and configured to accept a traffic encryption key;

a secure memory coupled to the communications terminal, wherein the secure memory is configured to store a wrapped first key wrapped using a single key encryption key (KEK) and a plurality of split partial portions of the single KEK, wherein a first split partial portion (s1KEK) of the single KEK is stored therein;

a physical interface to the secure memory and configured to temporarily interface physically with a portable crypto ignition key memory and accept from the crypto ignition key memory a second split partial portion (s2KEK) of the single KEK;

a communication interface to the secure memory configured to transfer a third split partial portion (s3KEK) of the single KEK received at the communications terminal from a source external to the communications system into the secure memory; and a key reconstitutor coupled to the secure memory and configured to reconstitute the single KEK from the s1KEK, s2KEK, and s3KEK; and a key unwrapper coupled to the secure memory and configured to decrypt the first key using the reconstituted single KEK; and a key fill interface between the key unwrapper and the encryption device configured to transfer a traffic encryption key into the encryption device, wherein the traffic encryption key is any of: the first key, a second key unwrapped using the first key, a second key received over an encrypted communications link protected by the first key, and a third key wrapped using a second key and received over an encrypted communications link protected by the first key.

19. The system of claim 18, wherein the communications interface is coupled to the communications terminal to receive the s3KEK via a wireless communications link, which comprises the encrypted communications link or a different communications link.

20. The system of claim 18, wherein the communications terminal comprises a wireless communications link, which comprises the encrypted communications link or a different communications link and is any of: a satellite communications terminal, a tactical communications terminal, a wireless networking terminal, and a personal communications terminal.

21. The system of claim 18, wherein the communications terminal comprises a wired communications link, which comprises the encrypted communications link or a different communications link and is any of: an Ethernet link, an optical link, and a dedicated line.

22. The system of claim 18, wherein the encryption device is any of a HAIPE (high assurance internet protocol encryptor) device, an IPsec device, a TRANSEC (transmission security) device, a secure storage device, and a type 1 cryptographic unit.

23. A key loading device for changing the security level of a communications terminal, the key loading device comprising:

a secure memory configured to store a first split partial portion (s1KEK) of a single key encryption key (KEK), and a wrapped (wK1) first key (K1) wrapped by the single KEK;

a data input port coupled to the secure memory and configured to temporarily interface physically with a portable crypto ignition key memory and accepting from the crypto ignition key memory a second split partial portion (s2KEK) of the single KEK and storing the s2KEK into the secure memory;

a terminal interface configured to interface to a communications terminal that is remotely located from the key loading device, accept a third split partial portion (s3KEK) of the single KEK from the remote communications terminal, and store the s3KEK into the secure memory;

a means for combining the s1KEK, s2KEK and s3KEK to reconstitute the single KEK, the means for combining being coupled to the secure memory, wherein the s1KEK, s2KEK and s3KEK are at a first security level, the single KEK cannot be reconstituted from less than all of the s1KEK, s2KEK and s3KEK, and the single KEK is at a third security level higher than the first security level;

a means for unwrapping the wK1 using the reconstituted single KEK to obtain the K1, the means for unwrapping being coupled to the secure memory; and a key output port configured to transfer a traffic key to cryptographic unit of the communications terminal.

24. The device of claim 23, wherein the K1 is the traffic key.

25. The device of claim 23, wherein a wrapped (wK2) second key (K2) is stored in the secure memory, and further comprising a means for unwrapping the wK2 using the K1 to obtain the second key K2, and the K2 is the traffic key.

26. The device of claim 23, wherein a wrapped (wK2) second key (K2) is received from the communications terminal, and further comprising a means for unwrapping the wK2 using the single reconstituted KEK to obtain the second key K2, and the K2 is the traffic key.

27. The device of claim 23, wherein the key output port is any of: a DS-101 interface, a DS-102 interface, a universal serial bus interface, an RS-232 interface, an RS-422 interface, an Ethernet interface, a firewire interface, an SD (secure digital) interface, an SDIO (secure digital input output) interface, an eSATA (external serial advanced technology attachment) interface, and a USB (universal serial bus).

* * * * *